(12) United States Patent
Nagle et al.

(10) Patent No.: US 6,305,905 B1
(45) Date of Patent: Oct. 23, 2001

(54) BOLTED-ON PROPELLER BLADE

(75) Inventors: David P. Nagle, Westfield, MA (US); John A. Violette, Granby, CT (US)

(73) Assignee: United Technologies Corporation, Windsor Locks, CT (US)

(*) Notice: Subject to any disclaimer, the term of this patent is extended or adjusted under 35 U.S.C. 154(b) by 0 days.

(21) Appl. No.: 09/305,539

(22) Filed: May 5, 1999

(51) Int. Cl.$^7$ ........................................... B63H 1/20
(52) U.S. Cl. .................. 416/204 R; 416/226; 416/229 R
(58) Field of Search .................. 416/204 R, 226, 416/229 R, 230, 220 R, 220 A, 219 A, 244 B

(56) References Cited

U.S. PATENT DOCUMENTS

| | | | |
|---|---|---|---|
| 3,554,664 | * 1/1971 | Cheeseman et al. | 416/230 |
| 3,637,323 | 1/1972 | Chilman et al. | 416/139 |
| 3,734,642 | * 5/1973 | Dixon | 416/204 |
| 4,260,332 | * 4/1981 | Weingart et al. | 416/230 |
| 4,915,590 | * 4/1990 | Eckland et al. | 416/204 R |
| 4,921,403 | 5/1990 | Poucher et al. | 416/147 |
| 5,022,824 | * 6/1991 | Violette et al. | 416/230 |
| 5,074,754 | 12/1991 | Violette | 416/248 |
| 5,222,297 | 6/1993 | Graff et al. | 29/889.71 |
| 5,415,527 | 5/1995 | Godwin | 416/205 |

FOREIGN PATENT DOCUMENTS

| | | |
|---|---|---|
| 289647 | 5/1991 | (DD). |
| 502409 | 3/1939 | (GB). |
| 1560829 | 2/1980 | (GB). |

* cited by examiner

*Primary Examiner*—Edward K. Look
*Assistant Examiner*—Ninh Nguyen

(57) ABSTRACT

A propeller blade for attachment to a receiving member of a hub of a propeller, is disclosed. The blade comprises a composite spar having an elongated portion formed in the shape of an airfoil. The elongated portion has a base end and a tip end, and a base portion for attachment to the receiving member. The base portion extends substantially transverse to the elongated portion and includes openings for receiving fasteners for fastening the spar to the receiving member. The blade also preferably includes an inner and outer sleeve for protecting the spar from frictional and compressive force wear in the base portion from fasteners. Preferably, the blade also includes an outer fiberglass shell and an inner weight tube for optionally adding more weight to the blade. The composite spar is preferably formed from a composite wall defining an interior space, which space is preferably filled with foam.

14 Claims, 3 Drawing Sheets

BOLTED-ON PROPELLER BLADE

TECHNICAL FIELD

This invention is directed to propeller systems and blades, and more particularly, to a propeller blade which is designed to be bolted onto and removed from a propeller system without disturbing the blade retention bearing preload.

BACKGROUND ART

Modem propeller blades typically include root portions which extend into the hub arm of the hub of the propeller system and which are secured to and rotatable relative to the hub arm via a retention assembly. Typically the retention assembly includes one or a plurality of ball bearing assemblies which permit the rotation of the blade in the hub arm for accomplishing pitch change of the blade for altering the speed of the propeller and accordingly, the aircraft. Typical propeller blade systems using this type of arrangement include the system shown in U.S. Pat. Nos. 3,637,323, 2,248,590, 4,921,403 and 5,415,527. As can be seen from the drawings of each of these systems, the root of the propeller blade extends into the hub arm and thereby is connected to the inner surface of the hub arm via a retention mechanism, typically in the form of ball bearing assemblies and fastening elements. As can be seen from observing these figures, the removal of the blade from the hub arm for maintenance, repair or for other reasons, is a cumbersome task, involving the breakdown and disassembly of the retention assembly as well as the draining of the lubricating fluids. Accordingly, while such systems offer advantages with regard to blade preload, and blade retention, in addition to the above, the root portion of the blade is typically complex in design since it must be formed to have its outer surface interact with the retention mechanism.

The prior art does include blades of the bolt-on variety which have been designed, in part, to defeat the shortcomings of the aforementioned designs. Several systems of this variety are shown in U.S. Pat. No. 5,074,754, directed to rotor blades, and U.S. Pat. No. 3,734,642, which is directed to a helicopter or aircraft rotor or blade. While the blade of U.S. Pat. No. 5,074,754 is bolted on via the application of retention plate 16 fastened to retention member 12 with blade 10 locked therebetween, this design suffers from various defects. For one, the blade is not directly retained by the fastening means or fasteners 18, but is indirectly retained via retention plate 16. In this manner, a level of protection is lost since failure of the plate as opposed to failure of multiple fasteners can lead to blade failure. In addition, the blade shown in this patent is apparently not a composite blade typical of current propeller systems and thereby has the disadvantages associated with not being formed from composite.

The blade in U.S. Pat. No. 3,734,642 is formed from a spar 18, 18' a primary outer sleeve 24 and a secondary inner sleeve or cuff 38 located inwardly of the spar. The spar in this case is formed from a composite material, but as shown in the FIG. 1 and FIG. 2 embodiment, the spar 18 or 18' does not extend to the base portion of the blade for fastening to the retention assembly or hub arm 14 since the composite, at the time of this patent, was not able to withstand the compressive forces of the fastening mechanisms. This is indicated in the background section where the author points out that the composite material cannot be bolted directly to the hub or other parts thereof because due to its fibrous nature, the composite material has a low shear strength at the bolt holes. Thereby, a rupture of the bonding connection between the composite blade or spar and the metallic cuff could progress so rapidly that adequate warning of impending blade failure could not be provided to the pilot in order for him to land the aircraft. Accordingly, the inventor for this patent set out to form a composite blade with an outer and inner sleeve for supporting the composite spar at the fastening interface. However, since the composite spar 18 does not extend to the base portion of the blade and accordingly is not directly fastened to the hub via fasteners 28, a level of security of the blade is lost. Reliability of securement is based solely on an adhesive holding the primary sleeve and cuff to the composite spar and thus, the composite spar to the propeller.

There exists a need, therefore, for a bolted-on composite propeller blade, which propeller blade is primarily formed from a composite spar, wherein the composite spar forms the elongated and base portion of the composite blade such that the blade is fastened to the retention assembly or hub arm by fastening the composite spar to the retention assembly or hub arm, thereby creating a strong, safe and easily removable composite propeller blade which does not disturb any preload of the retention assembly thereof.

DISCLOSURE OF THE INVENTION

The primary object of this invention is to provide a composite propeller blade formed in part from a composite spar, which blade includes fasteners used as the means for fastening the blade to a retention receiver member in a propeller hub, wherein the composite spar is mechanically captured by the fasteners when the blade is installed.

Another object of this invention is to provide a composite propeller blade which includes a bolt-on flange and an elongated body, wherein the body and flange of the blade is formed primarily from a composite spar.

Still another object of this invention is to provide a bolted-on propeller blade which is formed from a composite spar, wherein the composite spar forms the elongated portion of the blade as well as a flange portion of the blade, wherein the flange portion is adapted to receive fasteners for fastening the blade to the retention member in a propeller hub.

And still another object of this invention is to provide a bolted-on propeller blade, wherein the elongated portion of the blade is formed from a composite spar and a flange portion of the blade is also formed from the composite spar, wherein the flange portion includes openings for receiving fasteners for fastening the blade to a retention receiver member in a hub of a propeller, and wherein the blade further includes an inner and outer sleeve for protecting the composite flange from frictional and compressive force damage.

The foregoing objects and following advantages are achieved by the propeller blade of the present invention for attachment to a receiving member of a hub of a propeller. The blade comprises a composite spar having an elongated portion formed in the shape of an airfoil. The elongated portion has a base end and a tip end, and a base portion for attachment to the receiving member. The base portion extends substantially transverse to the elongated portion and includes openings for receiving fasteners for fastening the spar to the retention receiving member. The blade also preferably includes an inner and outer sleeve for protecting the spar from frictional and compressive force wear in the base portion from fasteners. Preferably, the blade also includes an outer fiberglass or Kevlar® shell and an inner weight tube for optionally adding more weight to the blade.

The composite spar is preferably formed from a composite wall defining an interior space, which space is preferably filled with foam.

DETAILED DESCRIPTION OF THE PREFERRED EMBODIMENT

Figure 1:
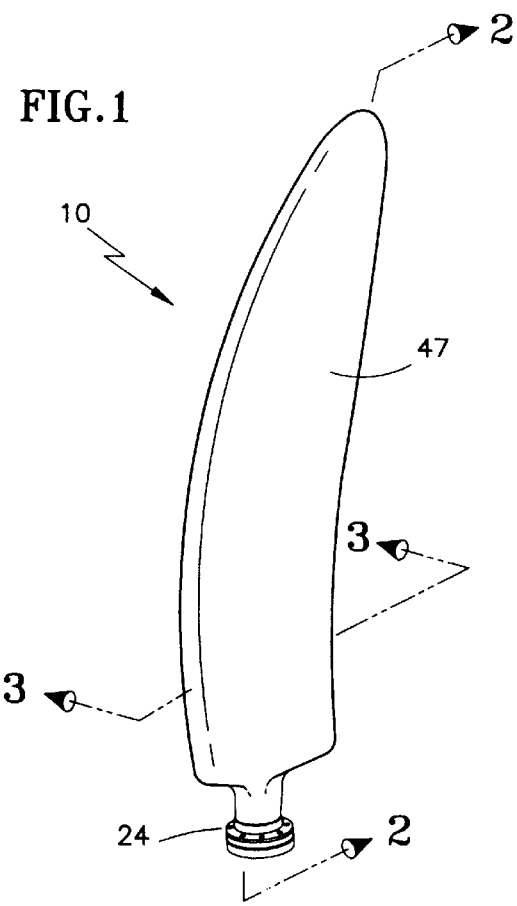
FIG. 1 is a plan view of a bolted-on propeller blade of the present invention.
Figure 2:
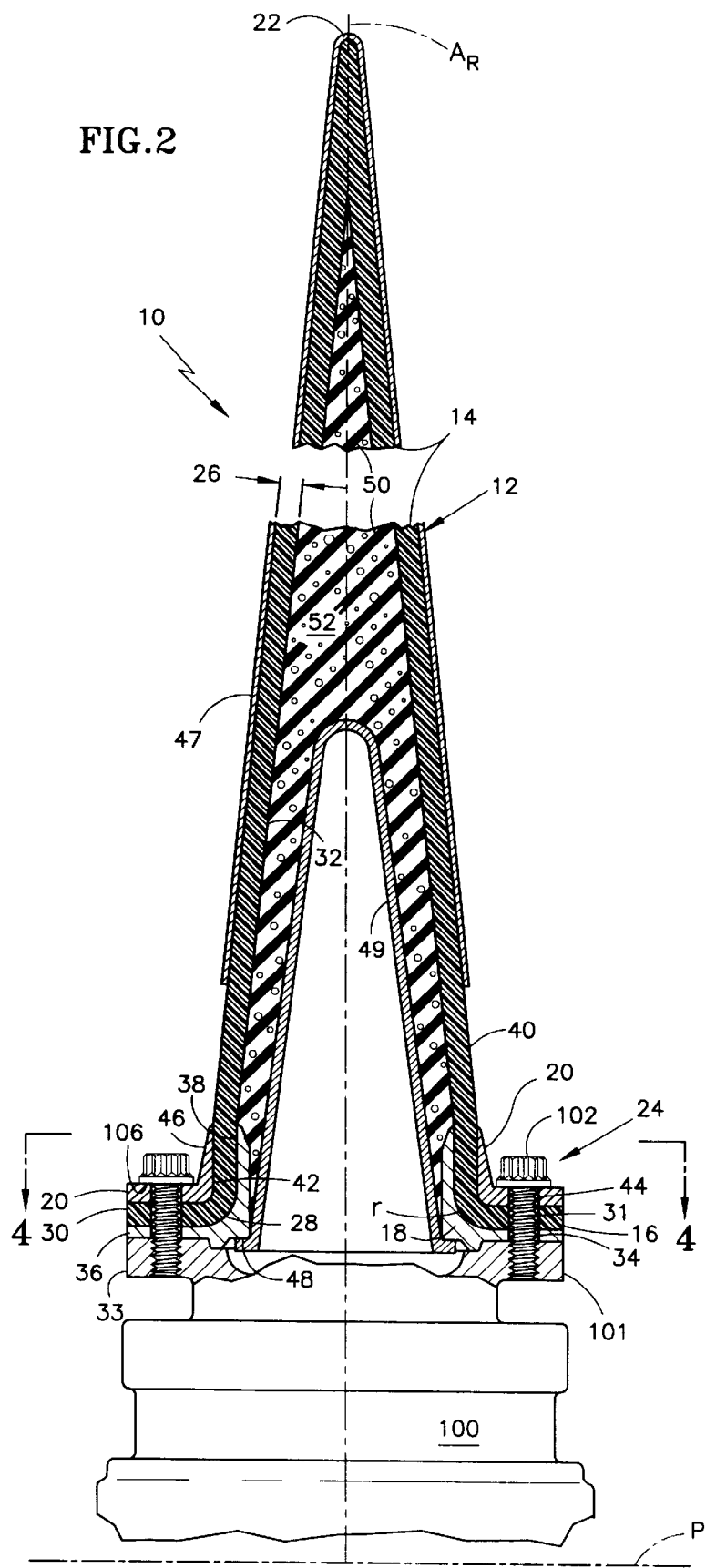
FIG. 2 is a cross-sectional view of the bolted-on propeller blade of the present invention shown fastened to a receiving portion of a propeller system taken along line 2—2 of FIG. 1.

Referring now to the drawings in detail, there is shown in FIG. 1 a plan view of a composite propeller blade of the present invention, designated generally as 10. As shown in FIG. 2 the composite propeller blade 10 of the present invention is bolted on to a retention receiving member 101 of a propeller system hub 100, via fasteners 102 such that the blade 10 can be installed and removed from the propeller system hub 100 without disturbing any preload or lubrication of the retention assembly.

Propeller blade 10 generally includes a composite spar 12 which has an elongated portion 14 and an integral base portion 16, an inner sleeve 18 for providing protection and support to the inside surface of spar 12, and an outer sleeve 20 for providing protection and support to the outside surface of spar 12.

Figure 3:
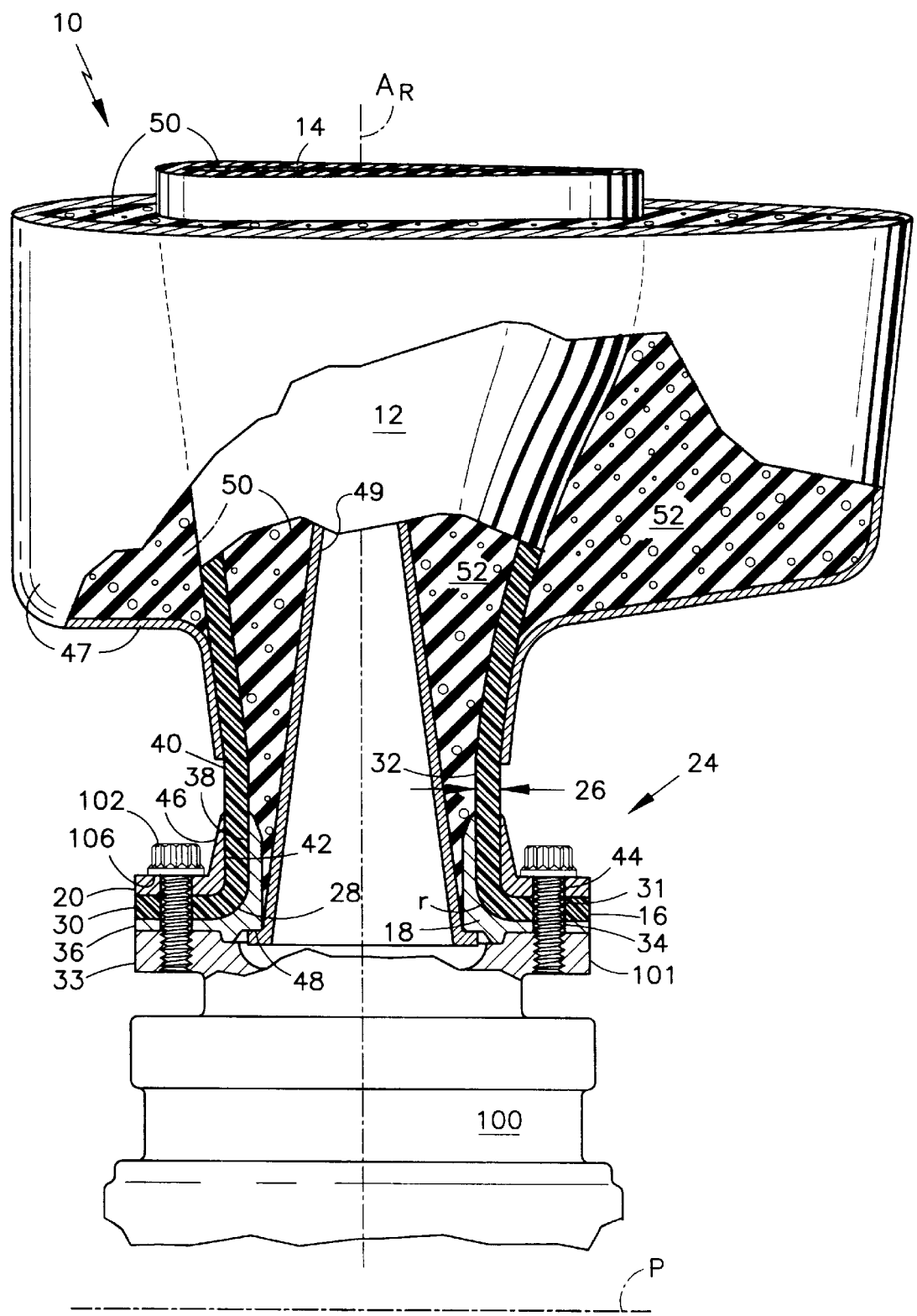
FIG. 3 is a partially cross-sectional view of the inboard end of the blade taken along line 3—3 of FIG. 1.

Spar 12 is formed within the specific shape of an airfoil section of blade 10 based on known aerodynamic principles and for the operating parameters associated with its specific purpose such as use on a commuter aircraft, a cargo aircraft, etc. Accordingly, the elongated portion 14 of spar 12 is formed, by known methods, within the shape of the desired airfoil or blade, and as shown in FIG. 2 includes a tip end 22, near the outboard end of the blade, and a base end 24. Elongated portion 14 narrows in the thin part of the airfoil from base end 24 toward the tip end 22 and, as shown in FIG. 3, expands in a chord wise direction in accordance with typical airfoil design criteria. Spar 12, therefore is formed from a composite wall 26 which is fully integral from tip end 22, through elongated portion 14 and further through base portion 16. The material forming wall 26 is preferably graphite fiber reinforced resin material composite, utilizing tubular braided graphite interspersed with unidirectional layers of graphite fibers, however, other materials may be used. As is known, graphite composite is strong with respect to tensile and bending loads along the fiber direction. The braided graphite provides high torsional rigidity and chordwise integrity. Spar 12 extends inboard into a transitional portion 28 which essentially forms a radius r transitioning the spar 12 to the base portion 16. The transitional portion 28 is integral and continuous with the composite material of the spar 12, the elongated portion 14, and the base portion 16.

Base portion 16 extends from the transitional portion 28 at substantially a right angle or transverse to elongated portion 14, and in a plane perpendicular to the blade axis $A_R$, and parallel to the rotational axis P of the propeller system. Base end 24 has a width which extends substantially to the same width of the receiving member 101 of hub 100. Accordingly, upon installation, the edge 30 of base portion 16 is substantially in line with the edge 33 of the receiving member 101.

Figure 4:
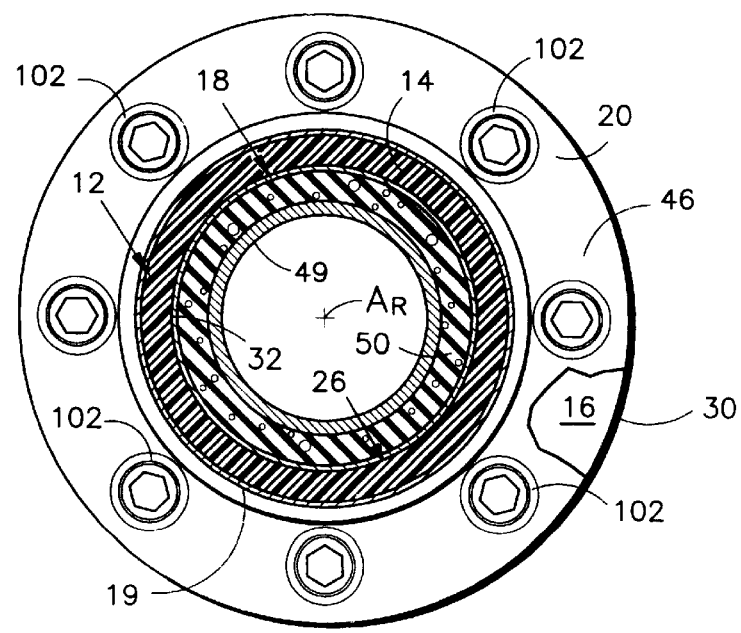
FIG. 4 is a partially cross-sectional view taken along line 4—4 of FIG. 2.

Base portion 16 extends substantially circularly around blade axis AR, as shown in FIGS. 1 and 4, wherein its plane, indicated above, is substantially transverse to blade axis $A_R$, also known as the pitch change axis of the propeller blade 10. About halfway from the transitional portion 28 to edge 30, base portion 16 includes a plurality of openings 31, preferably equally spaced thereabout, through the base portion for the reception of fasteners 102 for securing blade 10 to the receiver member 101 of the propeller system hub 100. One or more of these openings may be utilized to support precision alignment, means of a solid or a hollow pin. With the composite spar 12 forming the portion of base portion 16, as described, the composite spar 12 is secured to the hub of the propeller system via the fasteners thereby providing a mechanical capture of the spar which is not available in prior art composite blade designs.

Inner sleeve 18 is located adjacent to the inside surface 32 of composite spar 12 extending inboard across the transitional portion 28 and completely in contact with the inside surface 32 at base portion 16 of spar 12. Inner sleeve 18 is concentric to the inside diameter of spar 12, at an area immediately inboard spar 12, transitional portion 28, and inside surface 32 of base portion 16, as shown in FIG. 4. Accordingly, inner sleeve 18,provides structural support to the composite spar 12 at the elongated, transitional, and base portions thereof and also provides surface portion the inside surface 32 of the composite spar 12, in the same areas, so as to prevent frictional wear such as fretting and the like. In alignment with openings 31 and in base portion 16 of spar 12, inner sleeve 18 includes a plurality of openings 34 therethrough at the flange portion 36 thereof. Accordingly, the fasteners are also placed through the inner sleeve 18 for securing the same along with the spar to the hub of the propeller system. In addition, the outside surface 38 of inner sleeve 18 may or may not be adhered to the inside surface 32 of composite spar 12. An adhesive layer 19 is shown in FIG. 4. Alternatively, inner sleeve 18 can be an integral part of receiver 101, in which case it would not be adhered to the spar inside surface 32. Similarly, outer sleeve 20 is provided and is concentric to the outer surface 40 of spar 12, and includes an inner surface 42 in contact with the elongated portion 14, transitional portion 28 and base portion 16 of the composite spar 12. The outer sleeve 20 provides support to the composite spar at the elongated base 16 and transitional portions 28, and also provides for surface protection to the outer surface 40 of composite spar 12 at the same areas. The outer sleeve 20 includes a plurality of openings 44 in alignment with openings 34 and 31 of the inner sleeve 18 and base portion 16, respectively, also for receiving fasteners 102. Accordingly, fasteners 102 extend through outer sleeve 20, base portion 16 and inner sleeve 18, and the contact surfaces 106 of fasteners 102 contact only the outside surface 46 of outer sleeve 20, thereby protecting base portion 16 of composite spar 12 from frictional and compressive damage due the to fasteners. Similar to sleeve 18, outer sleeve 20 is adhered to the outer surface 40 of composite spar 12 at its inboard end, across the transitional portion 28 and over the entire upper surface of base portion 16.

In the manner as described above, composite spar 12, through base portion 16, is positively mechanically coupled or fastened to retention receiver 101 and in turn through bearings (not shown) to, propeller system hub 100 such that adhesion failures between the inner and outer sleeve and composite spar 12 would not cause complete failure of the blade. That is, the blade would remain secured to the hub via the fasteners regardless of the adherence of the sleeves, unlike the prior art.

In addition to the above, elongated portion 14 of composite spar 12, includes an integrally molded fiberglass or KEVLAR® shell 47 thereover for protective and aerodynamic reasons. Also, a weight tube 49 extends from the under portion 48 of inner sleeve 18 and upward inside the elongated portion 14 of blade 10, as shown for adding the capability to add weight to the blade, as desired, for balancing purposes. Further, foam 50 is provided in volume 52 defined by inside wall 26 of composite spar 12 to add further structural support to blade 10.

In assembly, the composite spar and shell assembly, in the form of the airfoil, along with the inner and outer sleeves adhered thereto, is placed adjacent the receiving member 101 of hub 100. Fasteners 102 are then placed through openings 44, 31, 34 in the outer sleeve 20, base portion 16, and inner sleeve 18, respectively, and the fasteners are secured to the receiving mechanism of the hub for securing the blade 10 to the receiving portion 101 of the propeller hub 100. The blade can be removed from receiving member 101 of the propeller hub 100 in the opposite manner wherein upon installation and removal, the blade does not disturb any preload which may be in place via the receiving member 101 in combination with the retention and rotational elements (not shown) of the blade retention assembly. In this manner, installation and removal of the blade from the propeller system hub 100 is greatly improved while the structural integrity of such a blade for achieving this is greatly increased.

Alternatively, the fasteners can be put through a throughhole through all parts, and a nut be used in the opposite end, eliminating the need to have high stress threads in the receiver member.

The primary advantage of this invention is to that a composite propeller blade formed in part from a composite spar is provided, which blade includes fastener receiver means for fastening the blade to a propeller hub, wherein the composite spar is mechanically captured by the fastener when the blade is installed. Another advantage of this invention is that a composite propeller blade is provided which includes a bolt-on flange and an elongated body, wherein the body and flange of the blade is formed primarily from a composite spar. Still another advantage of this invention is that a bolted-on propeller blade is provided which is formed from the composite spar, wherein the composite spar forms the elongated portion of the blade as well as a flange portion of the blade, wherein the flange portion is adapted to receive fasteners for fastening the blade to the propeller hub. And still another advantage of this invention is that a bolted-on propeller blade is provided, wherein the elongated portion of the blade is formed from a composite spar and a flange portion of the blade is also formed from a composite spar, wherein the flange portion includes openings for receiving fasteners for fastening the blade to a hub of a propeller, and wherein the blade further includes an inner and outer sleeve for protecting the composite flange from frictional and concentrated compressive force damage.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

What is claimed is:

1. A propeller blade for attachment to a receiving member of a hub of a propeller, comprising:

a composite spar having an elongated portion formed in the shape of an airfoil, wherein said elongated portion has a base end and a tip end, and a base portion for attachment to the receiving member, wherein the base portion extends substantially transverse to said elongated portion and includes fastening means for fastening said spar to said receiving member; and a means for protecting said base portion of the composite spar; wherein said means for protecting does not extend substantially beyond the base portion.

2. The blade according to claim 1, wherein said spar extends continuously and integrally from said tip end through said base end.

3. The blade according to claim 1, further comprising a transitional portion between and connecting said elongated portion and said base portion.

4. The blade according to claim 3, wherein said transitional portion is in the form of a curved portion integral with said base and elongated portion.

5. The blade according to claim 3, wherein said means for fastening comprise a plurality of fastener receiving openings spaced in and formed through said base portion.

6. The blade according to claim 1, wherein said base portion includes an outer surface and said elongated portion includes an outer surface, wherein said means for protecting comprises a sleeve concentric to said elongated portion, wherein said sleeve includes a first surface adjacent and in contact with said outer surface of said elongated portion and a second surface adjacent to and in contact with said outer surface of said base portion.

7. The blade according to claim 6, wherein said sleeve is adhered to said outer surface of said base portion and elongated portion.

8. The blade according to claim 6, wherein said sleeve is an integral part of said base portion.

9. The blade according to claim 1, wherein said base portion includes a bottom surface, further including means for protecting said bottom surface.

10. The blade according to claim 9, wherein said means for protecting said bottom surface comprises a protective sleeve adjacent said bottom surface and adapted to protect said bottom surface from damage.

11. The blade according to claim 10, wherein said protective sleeve is adhered to said bottom surface of said base portion.

12. The blade according to claim 10, wherein said sleeve is an integral part of said base portion.

13. The blade according to claim 1, further including a composite wall forming said elongated portion and said base portion, wherein said composite wall defines said airfoil and a hollow interior.

14. The blade according to claim 13, wherein said composite wall is continuous from said elongated portion to said base portion, said composite wall further defining a transitional portion between said elongated portion and said base portion for forming said base portion transverse and integral to said elongated portion.

* * * * *